United States Patent
Huang

(10) Patent No.: US 6,484,614 B1
(45) Date of Patent: Nov. 26, 2002

(54) WORKTABLE OF WORKPIECE PROCESSING MACHINE

(75) Inventor: Peter Huang, Taichung (TW)

(73) Assignee: Durq Machinery Corp. (TW)

( * ) Notice: Subject to any disclaimer, the term of this patent is extended or adjusted under 35 U.S.C. 154(b) by 0 days.

(21) Appl. No.: 09/850,168

(22) Filed: May 8, 2001

(51) Int. Cl.$^7$ .............................. B26D 1/18; B23Q 3/00
(52) U.S. Cl. ...................... 83/438; 83/477.2; 83/468.7; 269/318
(58) Field of Search ...................... 83/467.1, 477.2, 83/477, 438, 468.7; 144/287, 1; 269/318

(56) References Cited

U.S. PATENT DOCUMENTS

| | | | | |
|---|---|---|---|---|
| 3,176,559 A | * | 4/1965 | Kootz | 83/468.7 X |
| 4,566,510 A | * | 1/1986 | Bartlett et al. | 82/477.2 X |
| 4,658,687 A | * | 4/1987 | Haas et al. | 83/438 |
| 4,964,450 A | * | 10/1990 | Hughes et al. | 83/701 X |
| 5,181,446 A | * | 1/1993 | Theising | 83/438 |
| 5,293,802 A | * | 3/1994 | Shiotani et al. | 83/468.7 |
| 6,189,429 B1 | * | 2/2001 | Liu | 83/435.14 X |
| 6,293,176 B1 | * | 9/2001 | Talesky | 83/468.7 X |

* cited by examiner

Primary Examiner—M. Rachuba
Assistant Examiner—Jason Prone
(74) Attorney, Agent, or Firm—Browdy and Neimark, P.L.L.C.

(57) ABSTRACT

A worktable of a workpiece finishing machine comprises a first worktable and a second worktable. The first worktable has a first joining portion. The second worktable has a second joining portion which is joined with the first joining portion to enable the second worktable to slide back and forth along a predetermined direction provided by the first joining portion, thereby resulting in a change in the area formed between the first worktable and the second worktable for placing a workpiece to be finished by the workpiece finishing machine. The worktable further comprises a locating device formed of an arresting member with a first friction portion, and an actuating mechanism which is mounted on the second worktable and is connected with the arresting member. The arresting member is actuated to move back and forth between a first position and a second position, so as to enable the arresting member to press against the first worktable to attain the effect of locating the second worktable.

4 Claims, 9 Drawing Sheets

WORKTABLE OF WORKPIECE PROCESSING MACHINE

FIELD OF THE INVENTION

The present invention relates generally to a workpiece processing machine, and more particularly to a worktable of the workpiece processing machine.

BACKGROUND OF THE INVENTION

The ordinary workpiece processing machine, such as a circular saw or woodworking machine, has a worktable serving as a platform for placing a workpiece to be processed and for acting as a basis for moving the workpiece. In theory, a worktable with a greater area for placing the workpiece is good for the workpiece to be processed in various fashions. However, an excessively large worktable is sure to give an added volume and an additional weight to the workpiece processing machine, thereby resulting in an increase in cost of transportation of the workpiece processing machine.

The German Utility Pat. No. 2980112711 discloses a circular saw comprising a main worktable, and two auxiliary worktables which are provided in two sides thereof with a round rod that is received in one of two long through holes of the main worktable, thereby enabling each auxiliary worktable to be pulled to slide along the axial direction of the round rod so as to adjust the size of the workpiece placing area which is formed together by the main worktable and the two auxiliary worktables. The volume of the entire worktable can be made smaller by joining the auxiliary worktables with the sides of the main worktable. The space that is taken up by the circular saw can be thus minimized. In addition, the circular saw can be shipped with a relative ease.

The locating effect of the auxiliary worktables is attained by a plurality of wing bolts, which are fastened with the main worktable such that they can be pressed against the round rods of the auxiliary worktables. These bolts are apt to become unfastened by the vibrational motion of the circular saw in operation, thereby undermining the locating effect of the auxiliary worktables. The workpiece can not be therefore stabilized on the main worktable and the auxiliary worktables. In addition, it is inconvenient and time-consuming for a machine operator to fasten or unfasten the wing bolts in an effort to locate the two auxiliary worktables.

SUMMARY OF THE INVENTION

It is therefore the primary objective of the present invention to provide a workpiece finishing machine with a worktable which is designed to hold workpieces of various sizes.

It is another objective of the present invention to provide a workpiece finishing machine with a worktable which is easy to use.

In keeping with the principle of the present invention, the foregoing objectives of the present invention are attained by a worktable comprising a first worktable, a second worktable, and a locating device. The first worktable has a first joining portion. The second worktable has a second joining portion which is slidably joined with the first joining portion such that the second joining portion slides in a reciprocating manner along a predetermined direction, thereby enabling the second worktable to move toward or away from the first worktable. The locating device comprises an arresting member having a first friction portion, and an actuating mechanism which is mounted on the second worktable and is connected with the arresting member. The arresting member is actuated to move back and forth between a first position and a second position such that the arresting member is located at the second position. The second worktable has an urging portion, which urges the actuating member to move aside at the time when the arresting member moves from the first position to the second position, thereby enabling the first friction portion to attach to the second friction portion. As the arresting member arrives at the second position, the second friction portion presses against the first friction portion. As a result, the second worktable can not be continuously moved and is thus located.

DETAILED DESCRIPTION OF THE INVENTION

Figure 1:
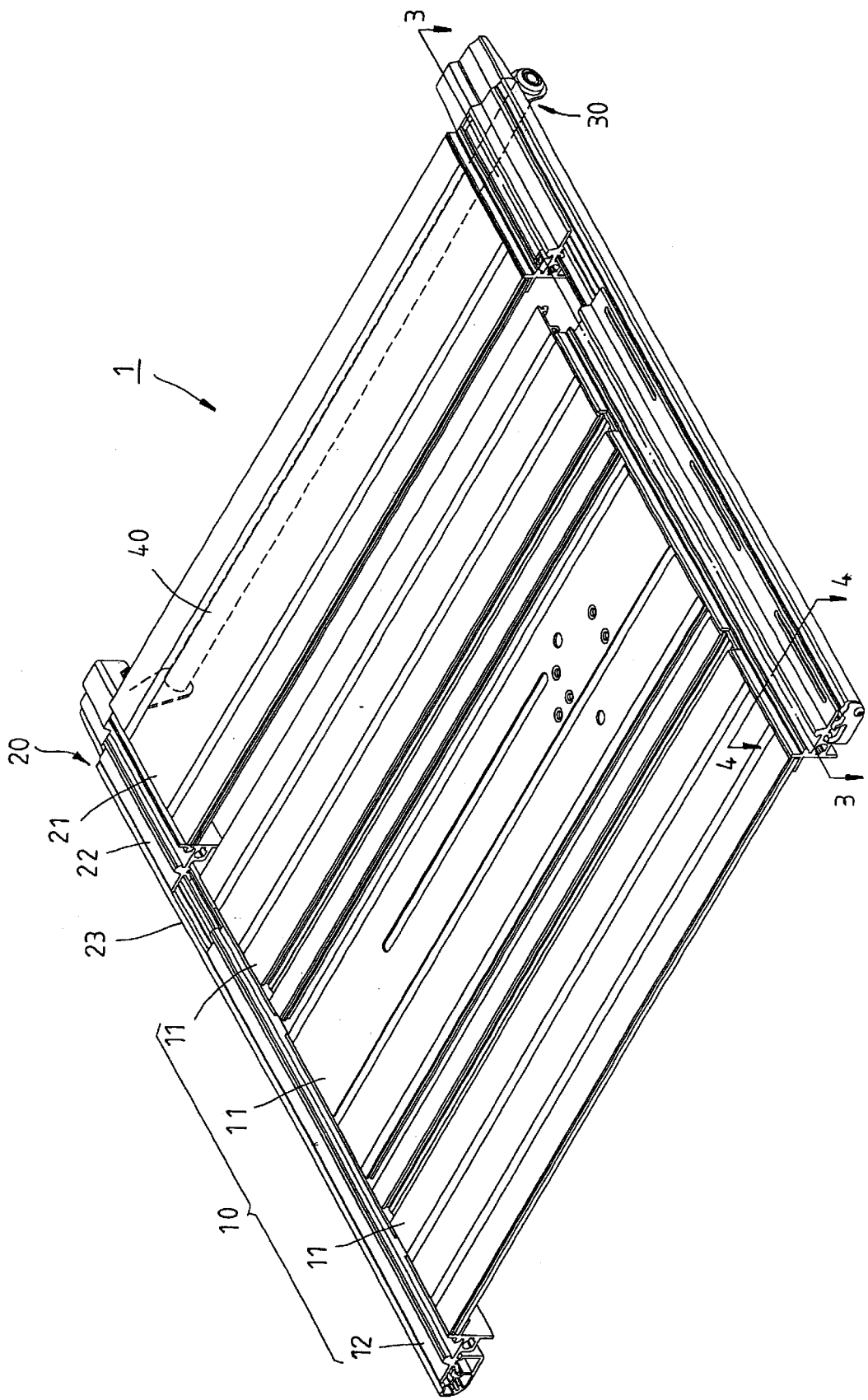
FIG. 1 shows a perspective view of a preferred embodiment of the present invention.
Figure 2:
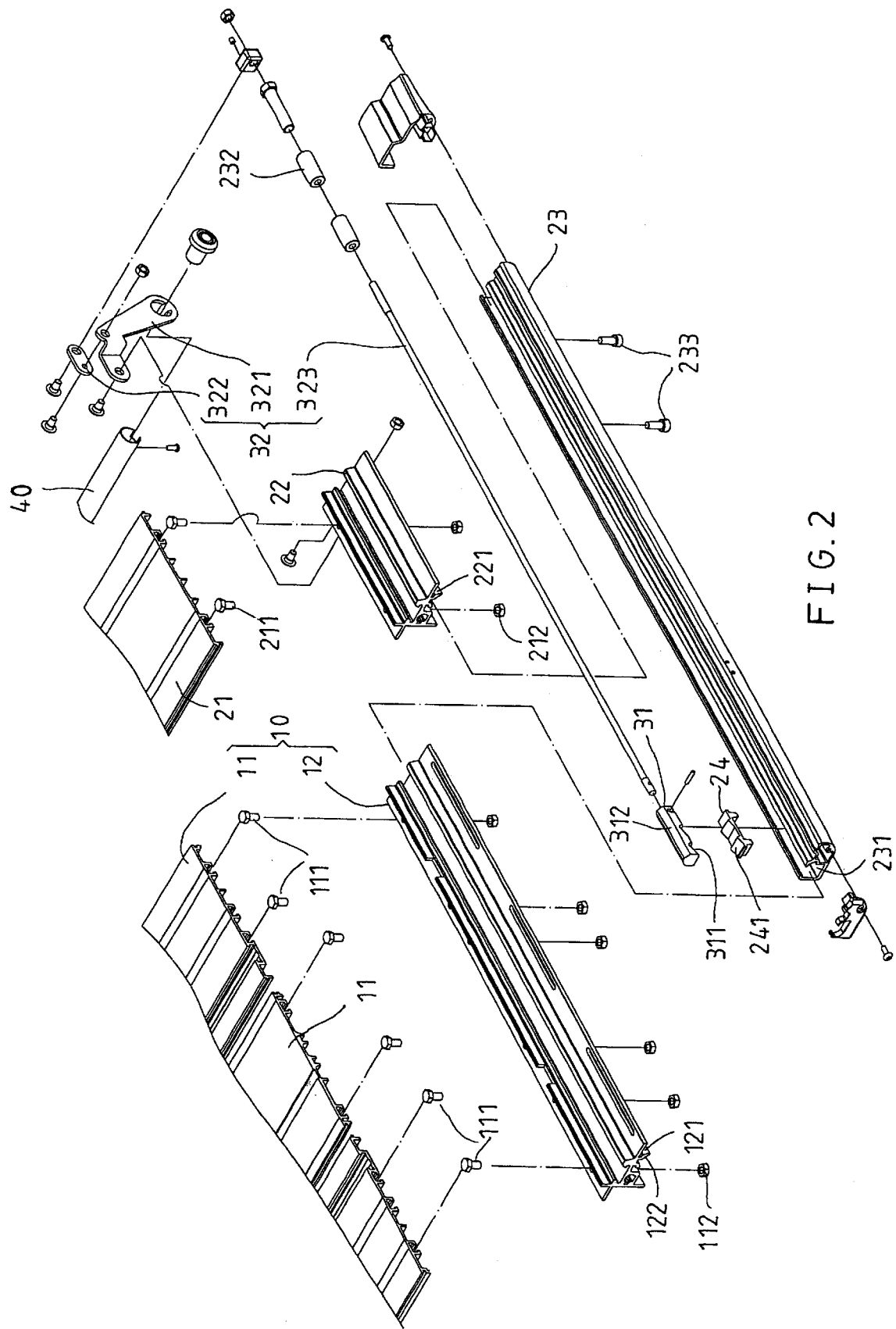
FIG. 2 shows a partial exploded view of the preferred embodiment of the present invention.

As shown in FIGS. 1–4, a worktable 1 of the preferred embodiment the present invention comprises the following component parts.

A first worktable 10 is formed of three unit plate bodies 11 of aluminium by extrusion, and two first side bars 12 which are fastened to two sides of the unit plate bodies 11 by a plurality of screws 111 and nuts 112. The first side bars 12 are provided in the underside with a first joining rail 121 extending along the axial direction of the first side bar 12, thereby forming the first joining portion of the first worktable 10. The first joining rail 121 is provided in the underside with two friction surfaces 122 extending along the first joining rail 121, thereby forming the second friction portion of the first worktable 10.

A second worktable 20 is formed of one unit plate body 21 of aluminum by extrusion, two second side bars 22, and two joining members 23. The two second side bars 22 are connected with two sides of the unit plate body 21 by a plurality of screws 211 and nuts 212. Each second side bar 22 is provided in the underside with the second joining rail 221 extending along the axial direction of the second side bar 22. The joining or track member 23 is provided with a slide slot 231, by which the joining member 23 is fitted on the second joining rail 221 of the second side bars 22. The slide slot 231 is provided with two shaft sleeves 232, which are located under the second joining rail 221 and are fastened in the slide slot 231 from the bottom of the joining member 23 by means of two bolts 233, thereby enabling the shaft sleeve 232 to engage the second joining member 23. The slide slot 231 of the second joining member 23 forms the second joining portion of the second worktable 20.

The second worktable 20 uses the slide slot 231 of its joining member 23 to join with the first joining rail 121 of the first side bar of the first worktable 10 such that the second worktable 20 slides along the slide slot 231 so as to move toward or away from the first worktable 10. Each slide slot 231 is provided in the bottom with an stop block 24 which is provided in the top with two inclined planes 241 similar in inclination and inclination direction, thereby forming a stop for the second worktable 20.

Figure 3:
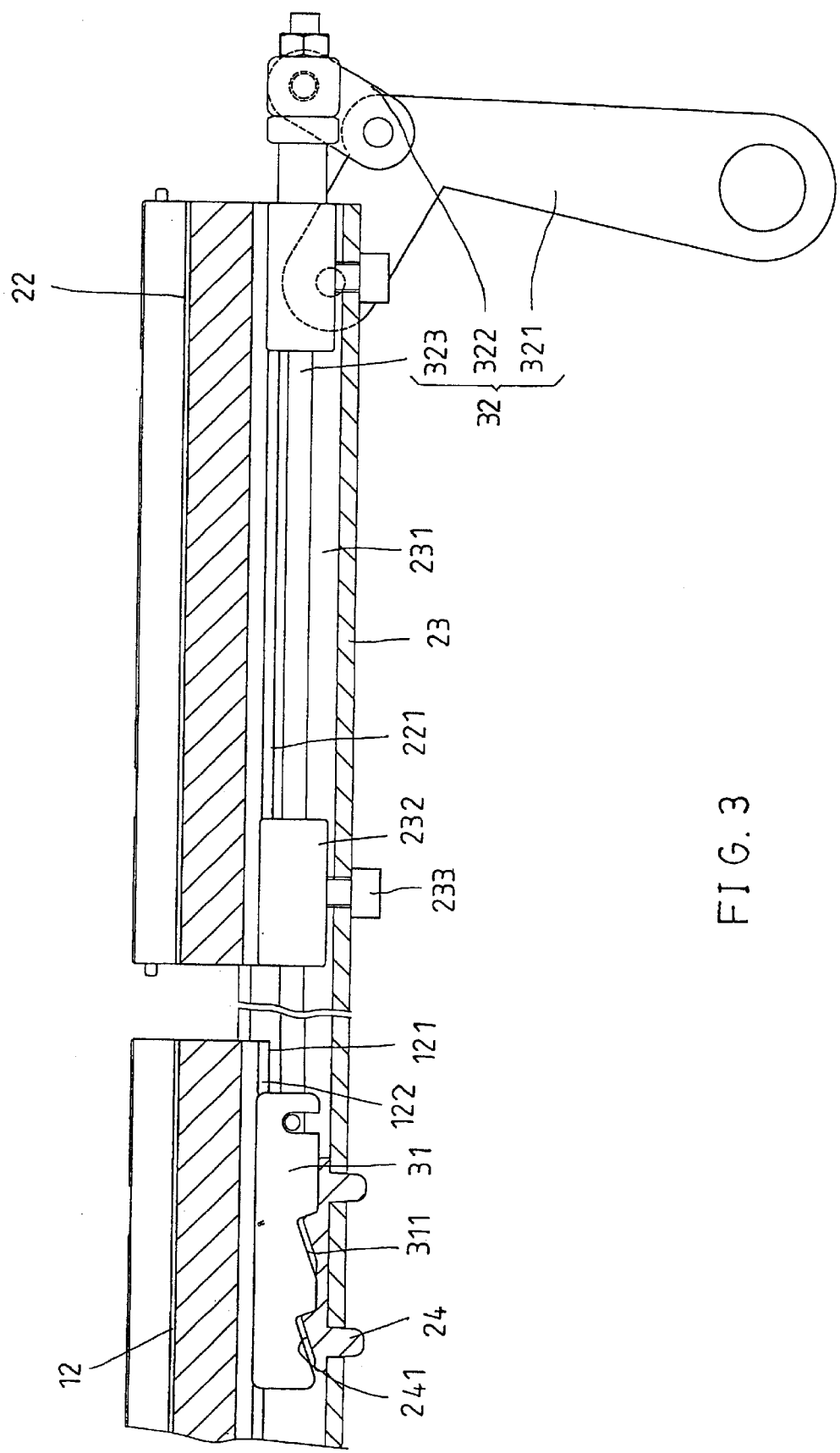
FIG. 3 shows a sectional view taken along a line 3—3 as shown in FIG. 1.
Figure 4:
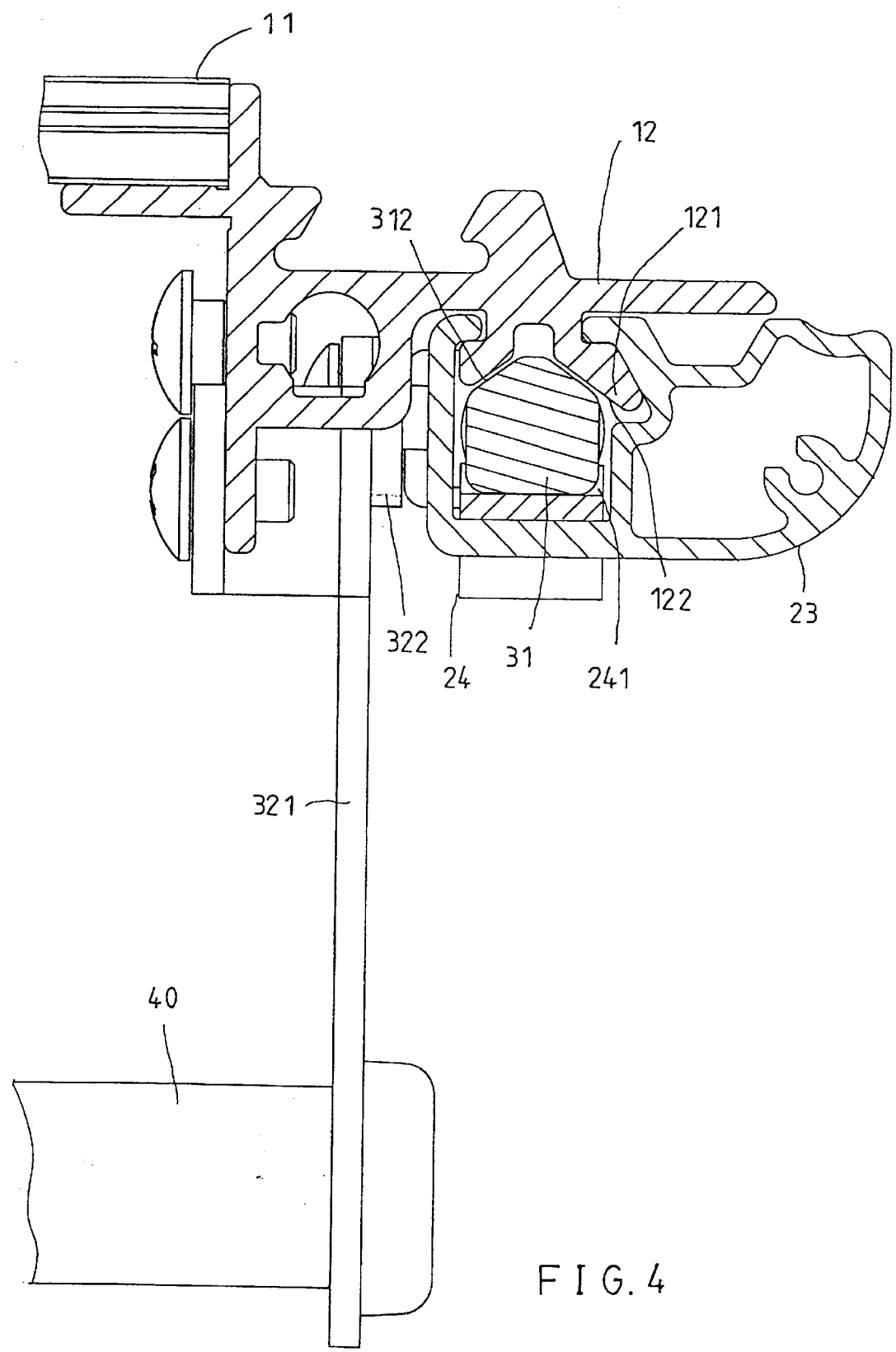
FIG. 4 shows a sectional view taken along a line 4—4 as shown in FIG. 1.
Figure 6:
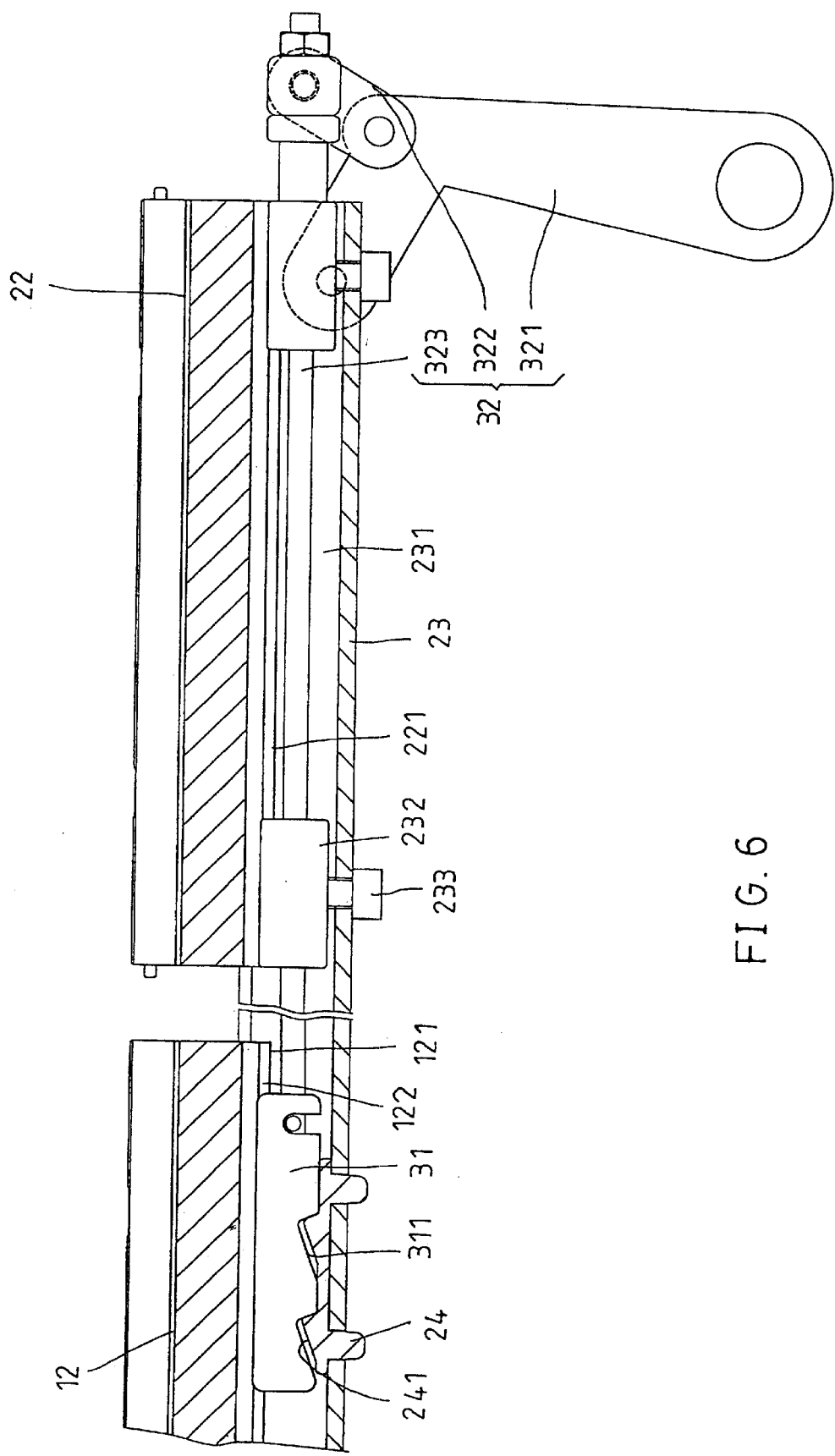
FIGS. 6 and 7 show the state of the use of the preferred embodiment of the present invention along the sectional view taken along the line 4—4 as shown in FIG. 1.
Figure 7:
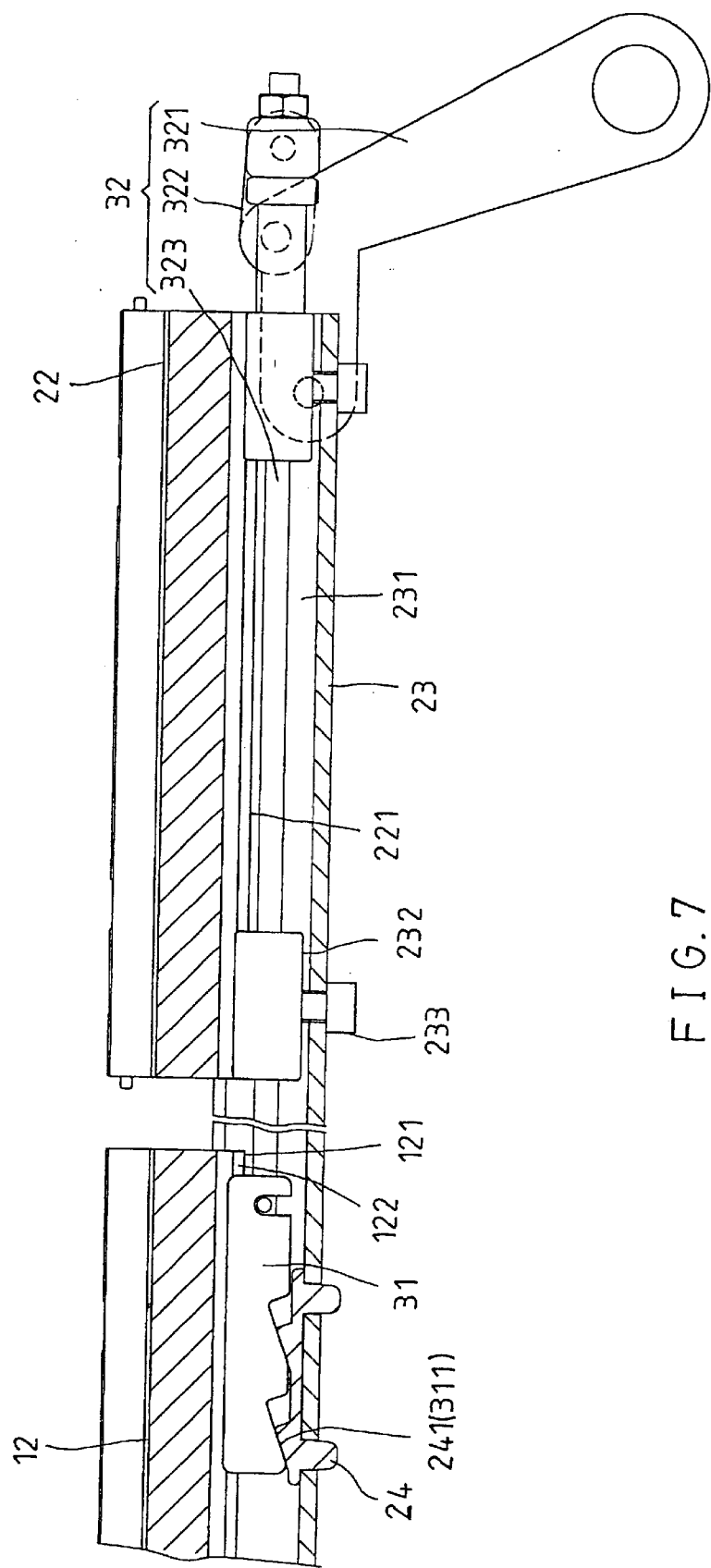
Figure 8:
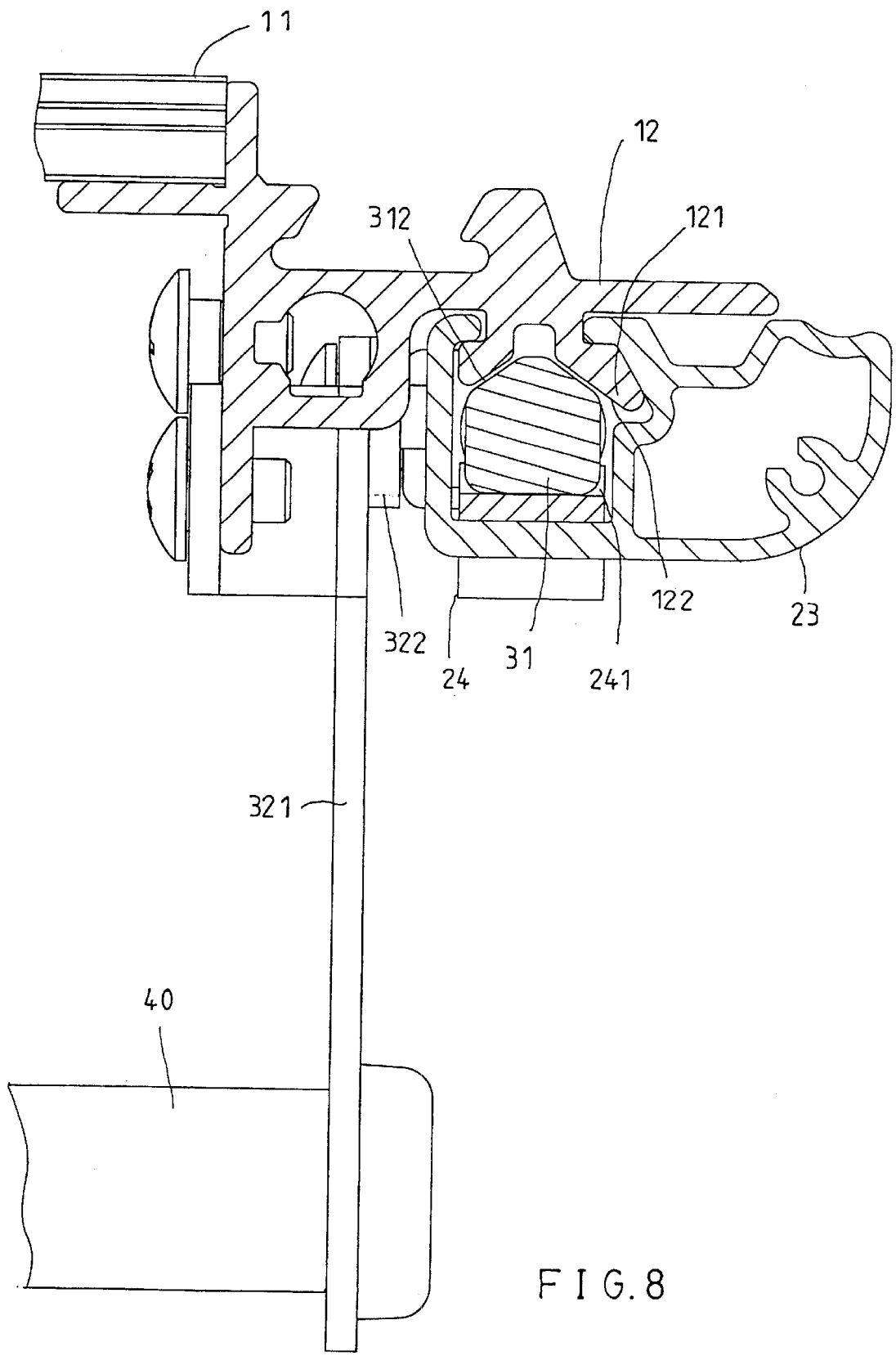
FIGS. 8 and 9 show the member state under the state shown in FIGS. 6 and 7 along the sectional view taken along the line 4—4 as shown in FIG. 1.
Figure 9:
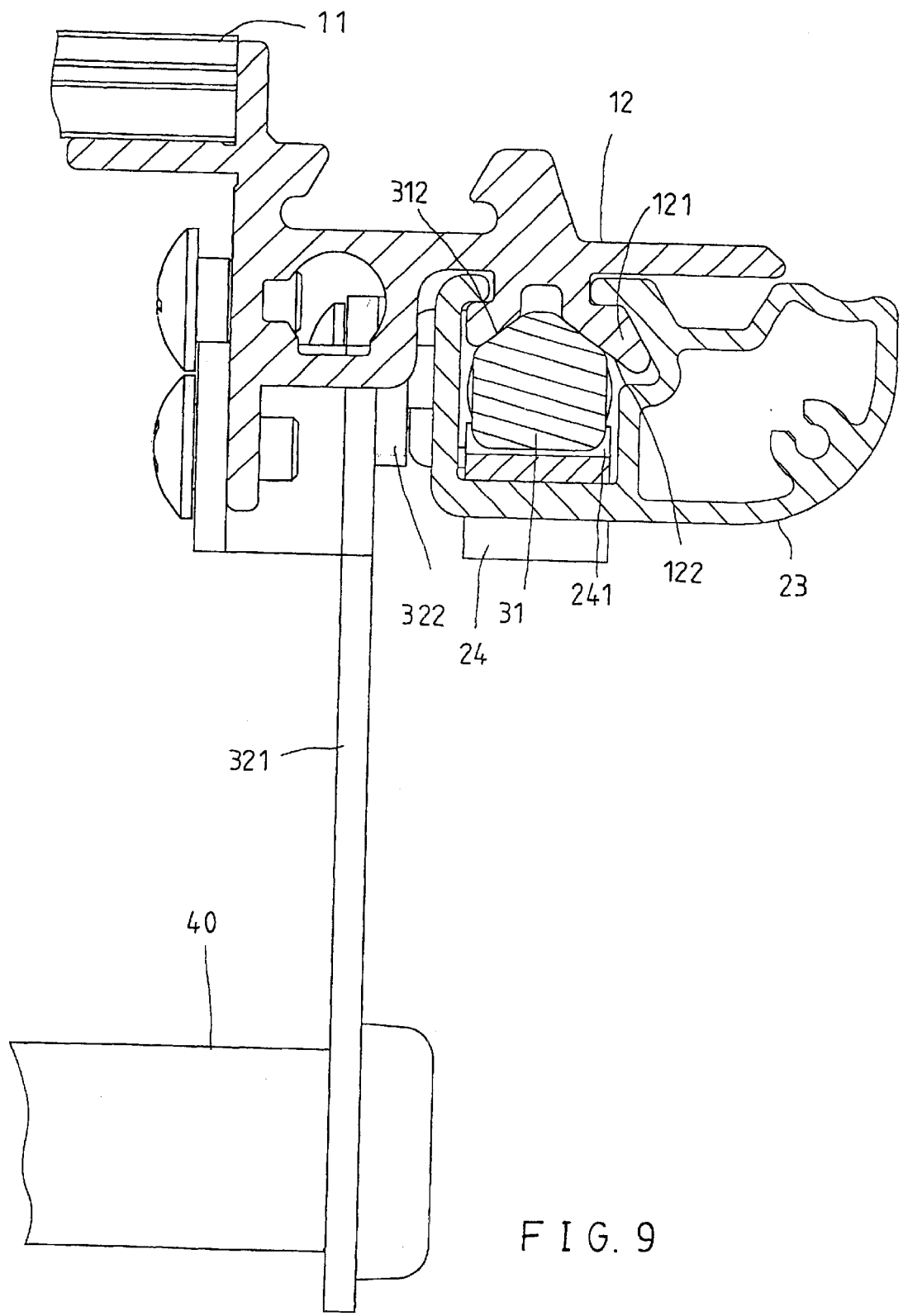

Two locating devices 30 comprise an arresting member 31 and an actuating mechanism 32. As shown in FIGS. 3 and 8, arresting member 31 is disposed above the stop block 24 which is located in the slide slot 231 of track 23. The arresting member 31 is provided in the bottom with two reverse inclined planes 311 opposite in direction to the inclined planes 241 of the stop block 24. In a first position as shown in FIGS. 6 and 8 inclined planes 311 are disengaged from inclined planes 241 thus permitting movement between table 20 relative to table 10. In this position the top of the arresting member 31 is separated from the bottom of the first joining rail 121 joining with the slide slot 231 by a predetermined distance. The top of arresting member 31 also has two friction surfaces 312 capable of contacting the bottom surfaces 122 of joining rail 121. In a second position as shown in FIGS. 7 and 9 when inclined planes are engaged against inclined planes 241, friction surfaces 312 are also engaged to bottom surfaces 122 resulting in locking movement between tables 10 and 20.

The actuating mechanisms 32 comprise an application rod 321, a linking rod 322, and a driven rod 323. The application rod 321 is pivoted to the inner side of the second side bar 22. The driven rod 323 is put through the shaft sleeve 232 to locate in the slide slot 231 such that one end thereof is connected with the arresting member 31. The linking rod 322 is pivoted at both ends with the application rod 321 and one end of the driven rod 323, thereby forming with the application rod 321 an angle smaller than 180 degrees. As the application rod 321 is wrenched to swivel upwards, the driven rod 323 is pulled outward from the slide slot 231 by means of the linking rod 322, so as to actuate the arresting member 31 to move likewise. The reverse inclined plane 311 of the arresting member 31 and the inclined plane 241 of the urging block 24 bring about a differential, thereby causing the arresting members 31 to rise at the same time such that the friction surface 312 engages the friction surfaces 122 of the bottom of the first joining rail 121. This is the second position shown in FIGS. 7 and 9 where the arresting member 31 is locked in the slide slot 231. The two locating devices 30 depend on a joining rod 40 which is joined at two end with the application rods 321. As a user applies the force on the joining rod 40, the two application rods 321 can be moved simultaneously.

Figure 5:
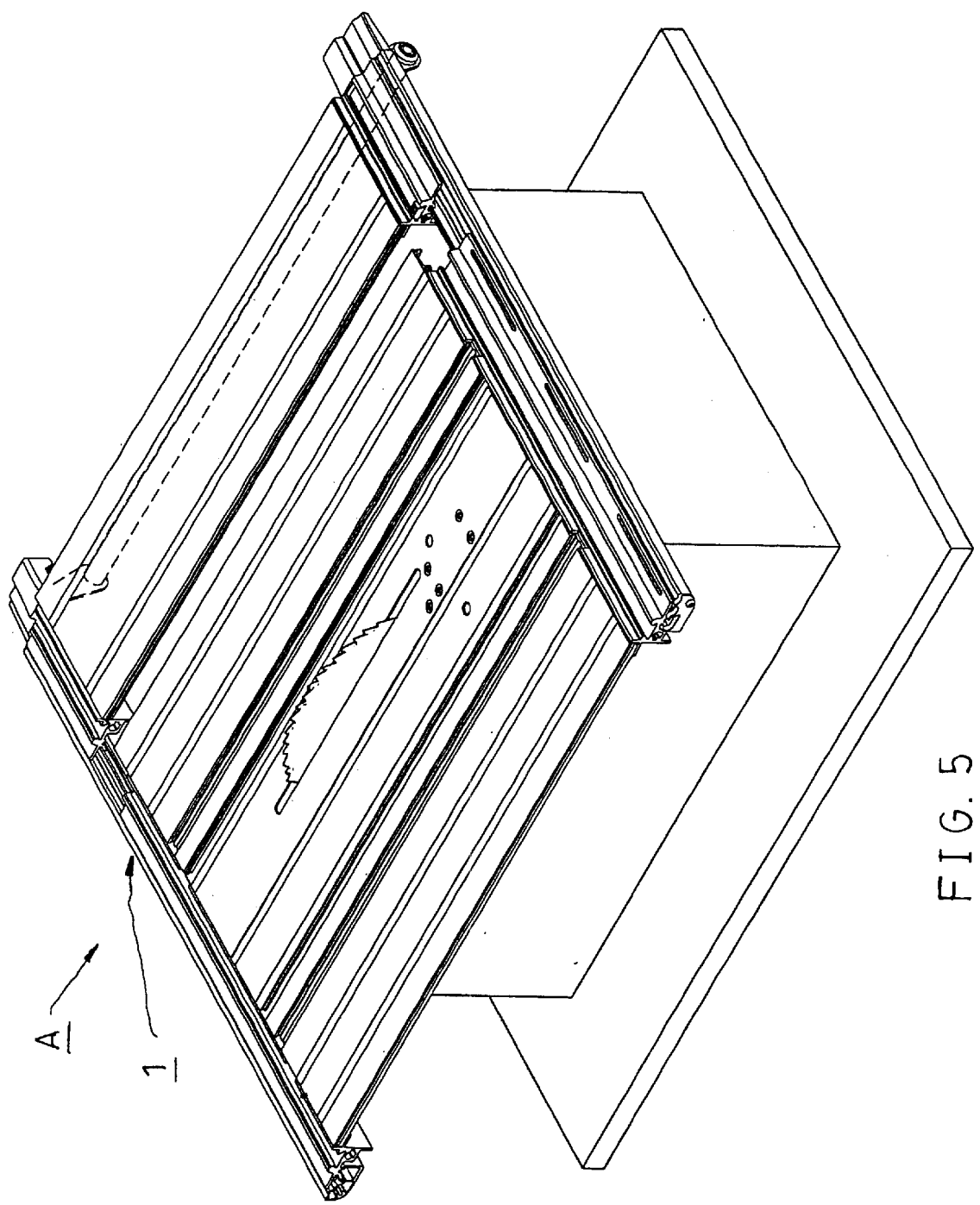
FIG. 5 shows a schematic view of the preferred embodiment of the present invention in use.

As shown in FIG. 5, a circular saw A is provided with the worktable 1 of the present invention such that the first worktable 10 is fastened with the base of the circular saw A. As shown in FIGS. 6–8, when a long or greater wood workpiece is processed by the circular saw A, the second worktable 20 is pulled to move along slide slot 231 to move away from the first worktable 10, thereby forming a greater area between the second worktable 20 and the first worktable 10 for placing the workpiece. The arresting members 31 are then locked at the second position.

When the second worktable 20 is moved to locate at the appropriate position, the user may wrench the joining rod 40 to move so as to cause the two application rods 321 to be exerted on by the force at the same time to swivel upward. Thereafter, the arresting member 31 is caused by the linking rod 322 and the driven rod 323 to move from the first position to the second position, thereby enabling the friction surface 312 of the arresting member 31 to press against the friction surface 122 of the first joining rail 121 so as to bring about the arresting effect. As a result, the first worktable 10 and the second worktable 20 are locked.

When the user applies the force on the joining rod 40 to cause the arresting members 31 to return to the first position, the first worktable 10 and the second worktable 20 are unlocked. As a result, the second worktable 20 can be pushed or pulled to change its position, so as to facilitate the processing of the workpiece of other sizes.

It is therefore readily apparent that the worktable 1 of the preferred embodiment of the present invention is suitable for use in placing the workpieces of various sizes in such a manner that the workpieces can be processed in a variety of patterns.

In light of the design of the two locating devices 30, the second worktable 20 can be located with ease and speed so as to enhance the usefulness of the first worktable 10. In addition, when locked the present invention is not affected in any way by the vibration of the circular saw A in operation, thereby enabling the workpiece to be placed on the first worktable 10 and the second worktable 20 with a great deal of stability.

What is claimed is:

1. A worktable of a workpiece processing machine, comprising:

a first worktable having at least one first joining portion fixed in a track;

a second worktable having at least one second joining portion slidably engaged in the track so as to permit said second worktable to move in the direction toward or away from said first worktable;

at least one locking device having an arresting member having a first friction portion, an actuating mechanism engaged on said second worktable and connected with said arresting member to actuate said arresting member to move the second worktable toward or away from the first worktable, wherein said first worktable further has at least one stop block fixed in the track with a first friction portion which is engaged by said arresting member when said actuating mechanism is actuated to move the second worktable away from the first worktable and wherein when the arresting member is engaged against the stop block locks movement of the second worktable relative to the first worktable stops; and wherein said actuating mechanism is formed of an application rod, a linking rod, and a driven rod, said application rod being pivoted on said second work table, said driven rod being located in said track through a shaft sleeve, and one end of said driven rod being connected with said arresting member; wherein said linking rod is pivoted at both ends with said application rod and one end of said driven rod, said linking rod forming with said application rod an angle smaller than 180 degrees, said application rod being exerted on by an external force to swivel upward so as to cause said driven rod to be pulled outwards from said track by said linking rod, thereby actuating said arresting member to move into engagement with the stop block.

2. The worktable as defined in claim 1, wherein said first worktable has two first joining portion; wherein said second worktable has two second joining portions.

3. The worktable as defined in claim 2, wherein said first worktable is formed of three unit plate bodies made of aluminum by extrusion, and two first side bars fastened to two sides of said three unit plate bodies by means of a plurality of screws and nuts, each of said first side bars being provided in the underside with a first joining rail of a predetermined length and extending along the axial direction of said side bar, thereby forming the first joining portion of said first worktable; wherein said second worktable is formed of a unit plate body made of aluminum by extrusion, two second side bars, and two joining members, said two second side bars being fastened to two sides of said unit plate body by means of a plurality of screws and nuts, said two second side bars being provided in the underside with a second joining rail extending along the axial direction of said side bar.

4. The worktable as defined in claim 3, wherein the stop block is formed with two inclined planes on a top thereof and is fixed at a bottom of said track, wherein said two inclined planes are similar in inclination and inclination direction to each other; where the arresting member have two reverse inclined planes opposite in inclination direction to said inclined planes of the stop block, wherein the reverse inclined planes are engaged to the inclined planes when movement of the second worktable away from the first worktable is stopped.

* * * * *